United States Patent
Sullivan

(10) Patent No.: US 7,869,168 B2
(45) Date of Patent: Jan. 11, 2011

(54) POWER CORD WITH GFCI DEVICE AND REMOTE TEST/RESET UNIT FOR AN ELECTRICAL APPLIANCE

(75) Inventor: Gregory Scott Sullivan, North Augusta, SC (US)

(73) Assignee: Crane Merchandising Systems, Inc., Bridgeton, MO (US)

( * ) Notice: Subject to any disclaimer, the term of this patent is extended or adjusted under 35 U.S.C. 154(b) by 159 days.

(21) Appl. No.: 11/288,238

(22) Filed: Nov. 29, 2005

(65) Prior Publication Data

US 2007/0121260 A1    May 31, 2007

(51) Int. Cl.
*H02H 9/08* (2006.01)

(52) U.S. Cl. .......................................... 361/42
(58) Field of Classification Search ............ 361/42
See application file for complete search history.

(56) References Cited

U.S. PATENT DOCUMENTS

| | | | | |
|---|---|---|---|---|
| 4,164,701 A | * | 8/1979 | Gulledge et al. | 324/508 |
| 5,198,955 A | * | 3/1993 | Willner | 361/42 |
| 5,642,248 A | | 6/1997 | Campolo et al. | |
| 5,694,280 A | * | 12/1997 | Zhou | 361/45 |
| 5,864,455 A | | 1/1999 | Gernhardt et al. | |
| 5,966,280 A | * | 10/1999 | Cerminara et al. | 361/47 |
| 6,072,317 A | * | 6/2000 | Mackenzie | 324/536 |
| 6,104,352 A | | 8/2000 | Jones | |
| 6,187,394 B1 | * | 2/2001 | Johnson et al. | 428/13 |
| 6,414,829 B1 | | 7/2002 | Haun et al. | |
| 6,633,472 B2 | | 10/2003 | Lai | |
| 6,639,769 B2 | | 10/2003 | Neiger et al. | |
| 6,731,482 B2 | | 5/2004 | Juncu | |
| 6,735,066 B2 | | 5/2004 | Steffen | |
| D519,938 S | | 5/2006 | Laurent et al. | |
| 2006/0152867 A1 | * | 7/2006 | Bonasia et al. | 361/42 |

FOREIGN PATENT DOCUMENTS

| | | |
|---|---|---|
| EP | 641055 A1 | 3/1995 |
| EP | 945949 A2 | 9/1999 |

OTHER PUBLICATIONS

International Search Report dated Dec. 4, 2007 in PCT Application No. PCT/US06/45964.

* cited by examiner

*Primary Examiner*—Jared J Fureman
*Assistant Examiner*—Nicholas Ieva

(57) ABSTRACT

An electrical appliance includes a power cord having a GFCI device and an associated remote test/reset unit. The power cord includes a first end portion provided with a plug adapted to be inserted into an electrical outlet. The first end portion extends to a second end portion that is electrically coupled to a plurality of electrical components in the appliance. The test/reset unit is spaced from the GFCI device along the power cord. Preferably, the test/rest unit is connected to the power cord through an extension lead. With this arrangement the test/reset unit is actually remote from the GFCI device, allowing easy access to service personnel.

20 Claims, 2 Drawing Sheets

POWER CORD WITH GFCI DEVICE AND REMOTE TEST/RESET UNIT FOR AN ELECTRICAL APPLIANCE

BACKGROUND OF THE INVENTION

1. Field of the Invention

The present invention pertains to the art of electrical appliances and, more particularly, to an electrical appliance provided with a ground fault circuit protection device having a remote, easily accessible test/reset unit.

2. Discussion of the Prior Art

Providing circuit protection for electrical appliances is well known in the art. Certainly, virtually all receptacles are provided with some form of over current protection, typically a fuse or circuit breaker. In general, the fuse or circuit breaker functions to interrupt power to a receptacle or other electrical device in the event current flowing through the circuit exceeds a predetermined threshold value. The National Electrical Code (NEC) sets the standard for matching a particular circuit breaker with a particular size or gauge wire. In any case, by cutting off power to an electrical appliance having a shorted circuit, wires carrying the electrical current to the appliance are prevented from over-heating and possibly melting.

Several years ago, the National Electrical code implemented a requirement that all receptacles located in bathrooms, above kitchen counters, outdoors or other similar locations, be provided with ground fault protection. Towards that end, receptacles placed in the above locations/environments are now protected with a ground fault circuit interrupter (GFCI). The GFCI device could either be mounted at a circuit panel, i.e., incorporated into a circuit breaker, or provided directly at the receptacle. GFCI devices interrupt power to an electrical load in the event that a ground leak is detected. In simple terms, the GFCI device cuts off power to an electrical load having grounded portions of the load exposed to electrical current. By interrupting power to a device leaking current to ground, an individual who may come in contact with a grounded portion of the load will not receive a shock. In any case, once the faulty load has been disconnected, a reset button is activated to restore power to the receptacle. Most, if not all, GFCI devices are provided with a test button. When activated, the test button simulates a ground leak to test the functionality of the GFCI device.

Over the years, the NEC has called for GFCI protection in more and more applications. For instance, an impending change to the NEC will require that all vending machines be provided with GFCI protection. The impending change will require that a GFCI device be provided either at the circuit breaker, the outlet or in the power cord within 12" of the power cord plug. Accessing a circuit breaker to test or reset a GFCI device is generally not a problem. Circuit breakers are typically located in panels that, if not readily accessibly by service personnel, can be accessed by other on-site personnel. In contrast, GFCI devices that are located at the receptacle or in the power cord may be made generally inaccessible by the particular positioning of the vending machine. That is, a vending machine(s) or another electrical appliance(s) may block access to the receptacle or power cord plug, while the appliance may be quite difficult to move. If the GFCI device is made inaccessible, service personnel would be unable to test the functionality of the GFCI device or reset a tripped GFCI device after the problem that caused the initial trip is corrected.

Accordingly, despite the existence of various GFCI devices available in the prior art, there still exists a need for a GFCI device that can be employed with electrical appliances having receptacles or power cord plug portions that are inaccessible. More specifically, there exists a need for a GFCI device having a remote test/reset unit that can be employed in applications where access to a receptacle or power cord is, at least, substantially limited.

SUMMARY OF THE INVENTION

The present invention is directed to an electrical appliance provided with a ground fault circuit interrupter (GFCI) device that is provided with a remote test/reset unit. The electrical appliance includes a cabinet that houses a plurality of electrical components employed in the overall operation of the appliance. The appliance is provided with a power cord that electrically connects the electrical components in the cabinet to a source of electricity.

In accordance with the invention, the power cord includes a first end portion that is provided with a plug. The plug is adapted to be inserted into an electrical outlet. The first end portion extends to a second end portion which is electrically coupled to the plurality of electrical components in the cabinet. The first and second end portions are interconnected through an intermediate portion. Preferably, both the GFCI device and the test/reset unit are electrically coupled to the power cord, with the test/reset unit being separate from, yet electrically connected to, the GFCI device. Most preferably, the test/reset unit is spaced from the GFCI device along the power cord. In accordance with the most preferred form of the invention, the test/rest unit is connected to the power cord and the GFCI device through an extension lead. With this arrangement, the test/reset unit is actually offset from a main axis of the power cord, allowing installation at a location that provides access to service personnel.

Additional objects, features and advantages of the present invention will become more readily apparent from the following detailed description of a preferred embodiment when taken in conjunction with the drawings wherein like reference numerals refer to corresponding parts in the several views.

DETAILED DESCRIPTION OF THE PREFERRED EMBODIMENT

Figure 1:
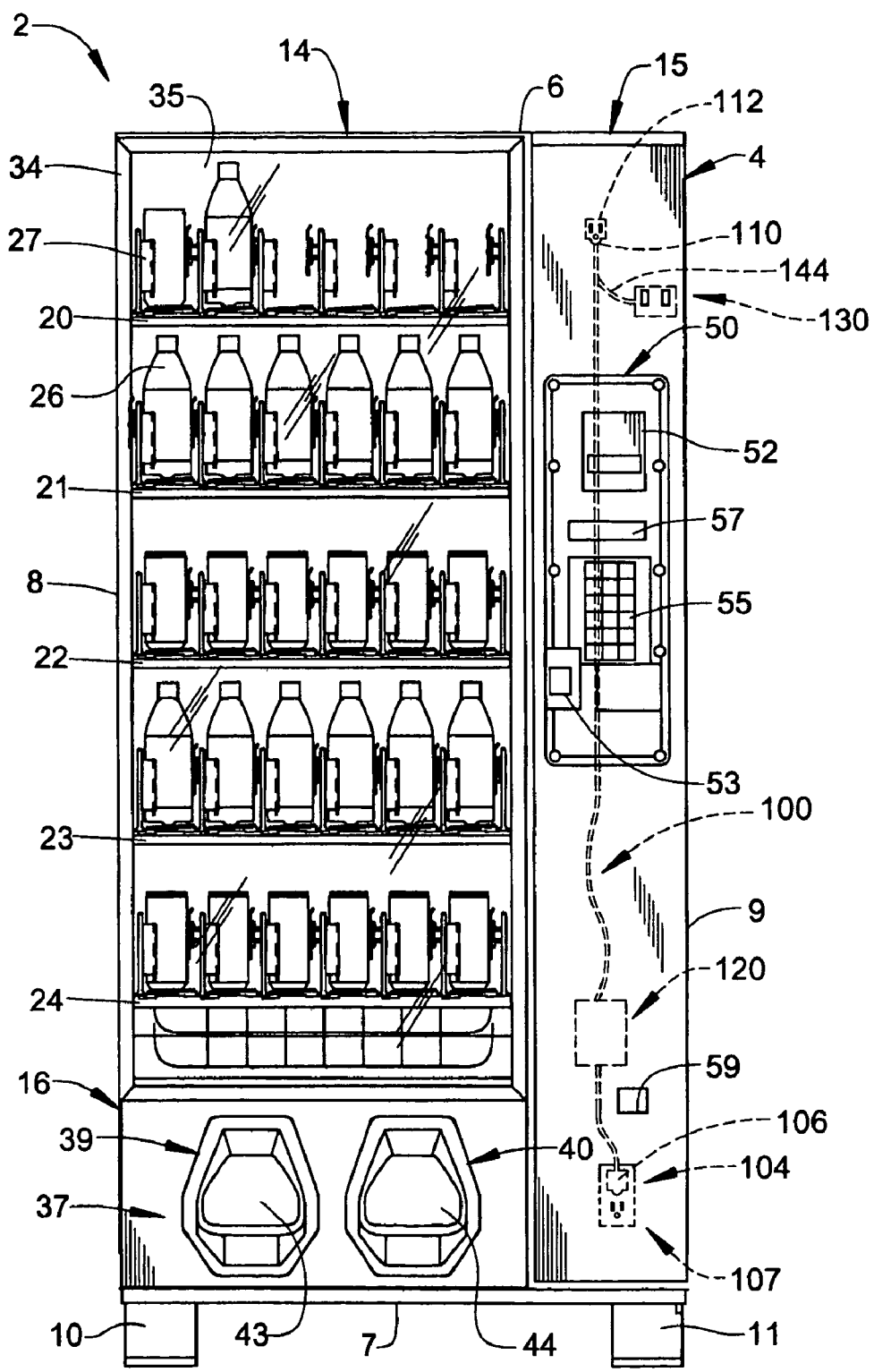
FIG. 1 is a front elevational view of an electrical appliance, in the form of a vending machine, incorporating a power cord having a GFCI device provided with a remote test/rest unit in accordance with the invention.

With initial reference to FIG. 1, an electrical appliance, shown in the form of a vending machine 2, includes a cabinet 4. As shown, cabinet 4 includes top, bottom and opposing side walls 6-9. Arranged below bottom wall 7 are a pair of leg members 10 and 11 for positioning vending machine 2 upon a supporting surface (not shown). In the preferred embodiment shown, vending machine 2 is divided into a plurality of zones for performing various functions associated with the delivery of products to a consumer. Towards that end, vending machine 2 includes a storage/display zone 14, a currency receiving zone 15 and a dispensing zone 16.

In the embodiment shown, storage/display zone 14 is provided with a plurality of product support shelves 20-24 for supporting and displaying a plurality of product containers, one of which is indicated at 26. Each of the plurality of product support shelves 20-24 includes an associated plurality of dispensing mechanisms 27 for delivering each product container 26 from storage/display zone 14 to dispensing zone 16. The actual construction and operation of the dispensing mechanisms does not constitute part of the present invention. Instead, various known dispensing mechanisms could be employed, including that set forth in detail in commonly assigned U.S. Pat. No. 6,571,988 entitled "Article Release Mechanism For a Vending Machine" issued on Jun. 3, 2003. Again, it should be understood that various other dispensing mechanisms could be employed, such as coils for prepackaged food items, conveyor belts, delivery cups or the like. In a manner known in the art, storage/display zone 14 is provided with a door 34 having a glass panel 35 that enables a consumer to view and choose between the variety of available product containers 26 stored within vending machine 2.

In accordance with the embodiment shown, dispensing zone 16 is arranged below storage/display zone 14 and includes a dispensing chamber 37 having a plurality of product access openings 39 and 40 that enable the consumer to remove a dispensed product from dispensing chamber 37. Product access openings 39 and 40 are provided with delivery doors 43 and 44 respectively, each of which is pivotally mounted to dispensing chamber 37 so as to be shiftable between a first position, effectively closing off a respective product access opening 39, 40 and a second position enabling the retrieval of a dispensed product from dispensing chamber 37.

In the embodiment shown, currency receiving zone 15 includes a currency receiving center 50 for inputting and storing currency deposited by the consumer during a vend transaction. Currency receiving center 50 includes a bill acceptor/validator 52, a multi-price coin mechanism 53 and a key pad 55 for inputting particular product selections. Currency receiving center 50 also includes a display 57 for providing information to the consumer, as well as validating the particular selection made. Finally, a coin return slot 59 is provided for returning any required change to the consumer at the completion of a vend operation. In general, the above described structure is provided for the sake of completes and to enable a better understanding of the figures. The present invention is actually directed to an electrical appliance circuit protection device employed in connection with vending machine 2 or other appliance.

Figure 2:
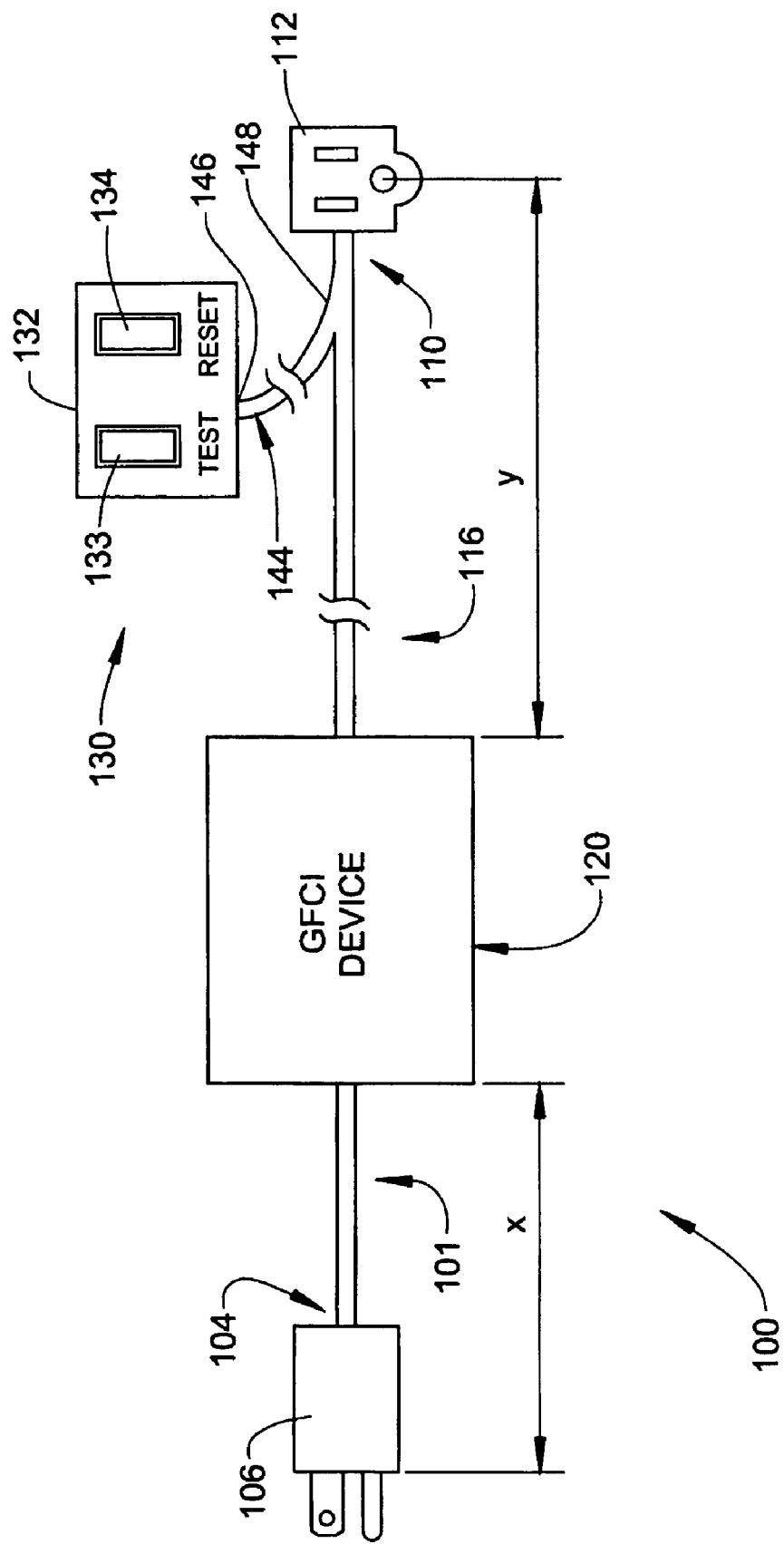
FIG. 2 is a detail view of the power cord of FIG. 1.

As illustrated in FIGS. 1 and 2, vending machine 2 includes a power cord 100 used to supply electrical energy to various electrical components housed within cabinet 4 such as, for example, dispensing mechanism 27, bill acceptor/validator 52 and display 57. Power cord 100 is shown to include main cord body 101 having a first end 104 provided with a male plug portion 106 that is adapted to cooperate with a receptacle 107. Plug portion 106 can be designed to interconnect with a standard 120 volt receptacle, a 220 volt receptacle, or any receptacle design which can transfer the power necessary to operate the various electrical components. First end 104 extends to a second end 110 having a female plug portion 112 that interconnects with vending machine 2. At this point, it should be noted that second end 110 could actually be hard-wired to vending machine 2. Extending between first and second ends 104 and 110 is an intermediate portion 116 of main cord body 101. In accordance with the embodiment shown, a ground fault circuit interrupt (GFCI) device is arranged along intermediate portion 116. GFCI device 120 functions to protect or interrupt power to vending machine 2 in the event of a current leak to ground.

In accordance with a preferred form of the invention, a test/reset unit 130 is spaced from GFCI device 120 along power cord 100. Test/reset unit 130 enables service personnel to test the operational capability of GFCI device 120 and reset power to vending machine 2 following a test or in the event that GFCI device 120 has sensed a fault condition and interrupted power to vending machine 2. Test/reset unit 130 includes a main body portion 132 upon which is mounted a test button 133 and a reset button 134. Of course, it should be understood that additional features, such as indicator lights, could also be provided on main body portion 132.

In accordance with the most preferred form of the invention, test/reset unit 130 is arranged remote from main cord body 101 of power cord 100 through an extension lead 144. Extension lead 144 extends from main cord body 101 and includes a first end 146 that leads into main body portion 132 and a second end 148 that ultimately connects to GFCI device 120. In the embodiment shown, extension lead 144 extends to intermediate portion 116 of power cord 100. However, it should be understood that test/reset unit 130 could be arranged at various other points along power cord 100 that are spaced from GFCI device 120.

With this construction, test/reset unit 130 provides a remote and easily accessible unit for testing or resetting GFCI device 120. That is, given the size and weight of vending machine 2, it is often the case that access to receptacle 107 is not readily available. Moreover, given the National Electric Code requirement that GFCI device 120 be located no more than 12 inches from first end 104 of power cord 100, it may not be even possible to access GFCI device 120. Thus, while GFCI device 120 must be located closer, i.e., within at least 12 inches, to first end portion 104, such as denoted by distance X in FIG. 2, the distance "Y" from GFCI device 120 to second end portion 110 can be of any length necessary to enable power cord 100 to reach from receptacle 107 to power vending machine 2. Therefore, by arranging test/reset unit 130 closer to second end portion 110, and preferably mounted to extension lead 144, the need to access receptacle 107 or GFCI device 120 is negated, and test/reset functions can be readily performed without the need to move vending machine 2.

Although described with reference to a preferred embodiment of the invention, it should be readily understood that various changes and/or modifications can be made to the invention without departing from the spirit thereof. For instance, while the test/reset unit is shown attached to the power cord through an extension lead, it should be understood that the test/reset unit could be provided along the axis of the power cord itself or at the female plug portion that connects to the appliance. In addition, while the electric appliance of the present invention is described as a vending machine, it should be understood that the present invention can be incorporated into any number of electrical appliances such as, for example, laundry appliances, refrigerators, cooking appliances or other types of electrical appliances that would benefit from GFCI protection and require access to a remote/test unit. In general, the invention is only intended to be limited by the scope of the following claims.

I claim:

1. An electrical appliance comprising:
a power cord arranged to electrically connect the electrical appliance to a source of electricity, the power cord including:
a first end portion,
a second end portion, and
an intermediate portion interconnecting the first and second end portions;
a ground fault circuit interrupter electrically coupled between the first and second end portions, the ground fault circuit interrupter enclosed in a housing; and
a test/reset unit separate from and electrically connected to the ground fault circuit interrupter and permanently attached to the intermediate portion of the power cord, wherein the test/reset unit is separated from the ground fault circuit interrupter by at least a portion of the intermediate portion of the power cord that is external to the housing of the ground fault circuit interrupter.

2. The electrical appliance according to claim 1, wherein the power cord includes a main cord body defined, at least in part, by the intermediate portion, and an extension lead extending from the main cord body, the test/reset unit being connected to the extension lead.

3. The electrical appliance according to claim 2, wherein the extension lead is connected to the intermediate portion, between the ground fault circuit interrupter and the second end portion.

4. The electrical appliance according to claim 1, wherein the ground fault circuit interrupter is located closer to the first end portion than the second end portion and the test/reset unit is located closer to the second end portion than the first end portion.

5. The electrical appliance according to claim 1, wherein the test/reset unit is mounted on a front of the cabinet housing.

6. The electrical appliance according to claim 4, wherein the ground fault circuit interrupter is positioned approximately 12 inches from the first end portion.

7. The electrical appliance according to claim 1, wherein the electrical appliance is electrically connected to a vending machine.

8. A power cord for electrically connecting an appliance to a ground fault circuit interrupter comprising:
   a first end portion;
   a second end portion;
   an intermediate portion interconnecting the first and second end portions;
   a test/reset unit separate from and electrically connected to the ground fault circuit interrupter and permanently attached to the intermediate portion of the power cord, wherein the test/reset unit is separated from the ground fault circuit interrupter by at least a portion of the intermediate portion of the power cord that is external to a housing of the ground fault circuit interrupter.

9. The power cord according to claim 8, wherein the power cord includes a main cord body defined, at least in part, by the intermediate portion, and an extension lead extending from the main cord body, the test/reset unit being connected to the extension lead.

10. The power cord according to claim 9, wherein the extension lead is connected to the intermediate portion of the power cord.

11. The power cord according to claim 10, wherein the extension lead is connected to the intermediate portion, between the ground fault circuit interrupter and the second end portion.

12. The power cord according to claim 8, wherein the appliance is a vending machine.

13. The power cord according to claim 8, wherein the ground fault circuit interrupter is electrically connected to the first end.

14. An electrical appliance comprising:
   a cabinet;
   a power cord arranged to electrically connect the electrical appliance to a source of electricity, the power cord including a main cord body having a first end portion, a second end portion, and an extension lead extending from the main cord body;
   a ground fault circuit interrupter electrically coupled between the first and second end portions, the ground fault circuit interrupter enclosed in a housing; and
   a test/reset unit separate from and electrically connected to the ground fault circuit interrupter and permanently attached to an intermediate portion of the power cord that interconnects the first and second end portions, wherein the test/reset unit is separated from the ground fault circuit interrupter by at least a portion of the intermediate portion of the power cord that is external to the housing of the ground fault circuit interrupter, and electrically connected to the main cord body through the extension lead.

15. The electrical appliance according to claim 14, wherein the ground fault circuit interrupter is located closer to the first end portion than the second end portion and the test/reset unit is located closer to the second end portion than the first end portion.

16. The electrical appliance according to claim 15, wherein the ground fault circuit interrupter is positioned approximately 12-inches from the first end portion.

17. The electrical appliance according to claim 14, wherein the electrical appliance is a vending machine.

18. The electrical appliance according to claim 14, wherein the extension lead is connected to the intermediate portion of the power cord.

19. The electrical appliance according to claim 18, wherein the extension lead is connected to the intermediate portion, between the ground fault circuit interrupter and the second end portion.

20. The electrical appliance according to claim 17, wherein the test/reset unit is mounted with controls accessible through a front face of the vending machine.

* * * * *